United States Patent

Meier et al.

[11] Patent Number: 5,866,960
[45] Date of Patent: Feb. 2, 1999

[54] GAS-COOLED ELECTRICAL MACHINE

[75] Inventors: Walter Meier, Waltenschwil; Francesco Stallone, Windisch; Jens von Wolfersdorf, Untersiggnethal; Hans Zimmermann, deceased, late of Mönchaltorf, all of Switzerland, by Verena Zimmermann, executrix, Meinrad Werner Zimmermann, executor

[73] Assignee: Asea Brown Boveri AG, Baden, Switzerland

[21] Appl. No.: 966,999

[22] Filed: Nov. 10, 1997

[30] Foreign Application Priority Data

Dec. 19, 1996 [DE] Germany .................... 196 53 060.1

[51] Int. Cl.⁶ .................... H02K 3/24; H02K 3/50; H02K 9/00
[52] U.S. Cl. .................... 310/59; 310/57; 310/54; 310/260
[58] Field of Search .................... 310/52, 54, 57, 310/58, 62, 63, 60 A, 260

[56] References Cited

U.S. PATENT DOCUMENTS 4,797,588  1/1989  Capion .................... 310/54

FOREIGN PATENT DOCUMENTS

0392243B1  10/1990  European Pat. Off. .
0519091A1  12/1992  European Pat. Off. .
0519091B1  12/1992  European Pat. Off. .
1765060    4/1958   Germany .
1184852    1/1965   Germany .
2630171C2  1/1977   Germany .

Primary Examiner—Nestor Ramirez
Assistant Examiner—Judson H. Jones
Attorney, Agent, or Firm—Burns, Doane, Swecker & Mathis, L.L.P.

[57] ABSTRACT

In a gas-cooled electrical machine, the conductor bars (3, 4) in the winding overhang are cooled directly by a flow element of the cooling gas flow which is passed through cooling channels (8) located within the eyes (5a, 5b) of the bar ends. To this end, the bar levels of the winding bars, which are designed as a two-level bar, are spaced apart from one another in the eye region, and thus form a radial cooling channel (8). These radial cooling channels (8) are coupled to the discharge eyes (5b) by pipe connections (10) which are connected electrically, and in terms of the flow, to round connections (20). The cooling channels (9) in the round connections (20) are connected by means of insulating tubes (31) or insulating hoses to an induction area (32) of the machine fan, which is separated from the winding overhang area (30) by a bulkhead wall (33). The invention allows the bar ends and the round connections (20) connected to them in the winding overhang to be cooled optimally, since the cooling is direct.

6 Claims, 5 Drawing Sheets

GAS-COOLED ELECTRICAL MACHINE

BACKGROUND OF THE INVENTION

FIELD OF THE INVENTION

The invention relates to a gas-cooled electrical machine, as is described in the preamble of the first claim.

The invention is based on a prior art as is disclosed, for example, in EP-0 519 091 B1.

DISCUSSION OF BACKGROUND

In electrical machines with an indirectly cooled stator winding, the end links and the so-called round connections or phase connections connected to them in the winding overhang are cooled by a flow element of the cooling gas flow produced by the fan. In limit-rating machines, the end links and the phase connections are at risk of excessive heating. While the part of the winding embedded in the winding slots is cooled specifically, these exposed winding parts are heated not only by the current flow but also by the magnetic fields in the winding overhang area.

In rotating electrical machines with a directly cooled stator winding, the winding is composed of solid and hollow conductor elements, and in some machine types even just of hollow conductors. The coolant, which flows through the hollow conductors throughout the entire length of the stator bars, also results in the bars in the winding overhang being sufficiently cooled in this case. The round connections or phase connections are likewise designed as hollow conductors and are force-cooled by means of coolant.

In air-cooled machines and machines fed at one end, the cooling effect is no longer sufficient, particularly if the machine lengths are large. Thus, in order to improve the cooling effect, EP-0 392 243 B1 proposes that the winding bars, which are constructed from massive conductor elements, be provided with metallic cooling tubes/cooling channels located at the sides or between the two stacks of conductor elements. These are insulated from one another and from the conductor elements, and are located within the main insulation. They are supplied from both machine ends and from the machine center. The supply in the machine center is in this case provided by radial channels in the laminated stator core and openings in the main insulation. The heated cooling gas leaves the cooling channels through openings in the main insulation in the region of the end zones of the laminated stator core, and through radial channels in the laminated stator core.

Equipping stator winding bars with additional channels, and introducing such channels in the bar, reduce the slot filling factor. The moldings used for the input and output of the cooling gas, the majority of which are embedded in the main insulation, increase the manufacturing cost of the rods. In addition, no consideration is given to cooling of the round connections arranged in the winding overhang.

EP-0 519 091 B1 discloses a gas-cooled electrical machine in which only the metallic eyes used for the electrical and mechanical connection are specifically cooled. There, the eyes are provided with caps which virtually completely surround the eyes, leaving free one or more channels which run approximately axially. These channels are open toward the laminated stator core. A radially running bulkhead wall separates the winding overhang area from the induction area of the machine fan. At their ends on the bulkhead wall side, the caps have an opening, which is freely connected to the said channels. A flexible pipe leads directly from this opening into the induction area of the fan. Because of the pressure difference between the induction area and the winding overhang area, part of the flow of the coolant produced by the fan flows through the said channels and cools the eyes and, to a minor extent, the outermost bar ends as well. It could be regarded as being disadvantageous that the eyes are cooled by cooling gas which has already been heated as it flows through the end links in the winding overhang, that is to say a limited cooling effect is obtained. Any supply of fresh cooling gas would then be obtained only if special guidance devices were incorporated in the winding overhang area. Furthermore, the assembly cost for forced cooling of each individual eye is not negligible.

SUMMARY OF THE INVENTION

Accordingly, one object of the invention is to provide a novel electrical machine of the generic type mentioned initially, whose stator winding ends and the round connections connected to these stator winding ends in the winding overhang area can be sufficiently cooled by simple means.

According to the invention, this object is achieved by the features of the first claim.

The advantages of the invention are, inter alia, that radial first cooling channels in the region of the eyes make it possible to achieve adequate cooling of the bar ends by means of a cooling gas flow, these first cooling channels at the same time being directly connected, at discharge eyes, to second cooling channels in the round connections, which are designed as hollow conductors. These second cooling channels are connected by means of insulating hoses or tubes to an area which is separated from the winding overhang area by a bulkhead wall, as a result of which forced cooling of the round connections in conjunction with the discharge eyes is possible.

In this case, it is particularly advantageous if, in a preferred embodiment, the stator winding bars are designed as two-level bars whose bar levels in the winding overhang region are in each case spaced apart from one another by means of a wedge insert, such that the radial first cooling channels are formed between the bar levels at the bar ends. The eyes which fix the bar ends comprise connecting pieces, which are likewise spaced apart in the region of the first cooling channels. These eyes are surrounded by insulating caps, which each have an inlet and an outlet opening for the first cooling channels.

It is particularly advantageous if the cooling gas flow flows through the winding overhang, and thus the eyes of the bar ends, from the outside in the radial direction to the inside in the radial direction.

Such a winding arrangement permits a significant reduction in the components installed, with optimal cooling of the bar ends and connected round connections, as are proposed for cooling winding overhangs in limit-rating machines from the prior art.

The solution is based in particular on the idea of providing the cooling in the active part in the conventional sense, that is to say as indirect cooling, and of cooling the bar ends and round connections in the winding overhang, which are subject to end fields, directly in combination, by means of applied cooling.

An exemplary embodiment of the invention as well as the advantages which can be achieved by it are explained in more detail in the following text, with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
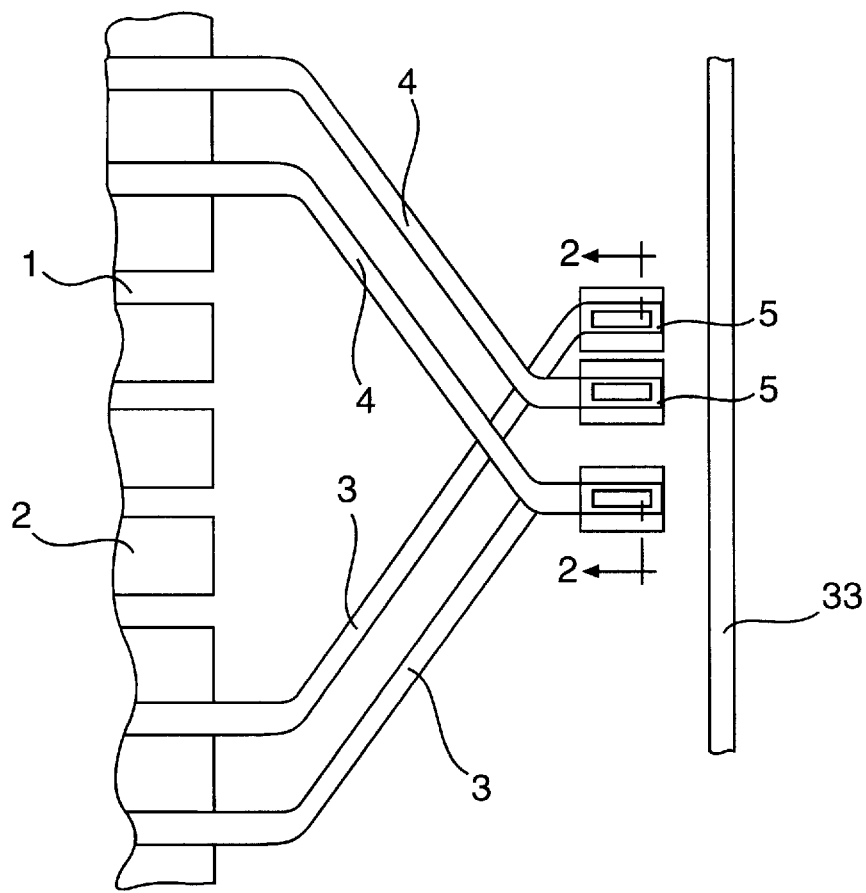
FIG. 1 shows a detail of a schematic development of the stator winding overhang of a gas-cooled electrical machine.

Referring now to the drawings, wherein like reference numerals designate identical or corresponding parts throughout the several views, FIG. 1 shows a greatly simplified detail of a schematic development of the stator winding overhang of a gas-cooled electrical machine. A lower bar 3 and an upper bar 4 are in each case located one above the other in each stator slot 1 in the laminated stator core 2. For reasons of illustration clarity, FIG. 1 shows only two lower bars and two upper bars. A lower bar 3 and an upper bar 4 coming from different slots 1 are in each case electrically and mechanically connected to one another by means of electrically insulated eyes 5 in the normal manner, and are interconnected in this way to form a winding. The totality of all the lower and upper bars emerging from the laminated stator core 2, together with the eyes 5, forms the stator winding overhang. Lower and upper bars comprise a multiplicity of electrically mutually insulated conductor elements 6, which are surrounded in a distributed manner on two conductor stack elements located alongside one another by common main insulation 7, which extends as far as the eye 5 (see FIGS. 2 and 3). Such a stator winding bar is also known as a two-level bar. To this extent, electrical machines are known.

Figure 2:
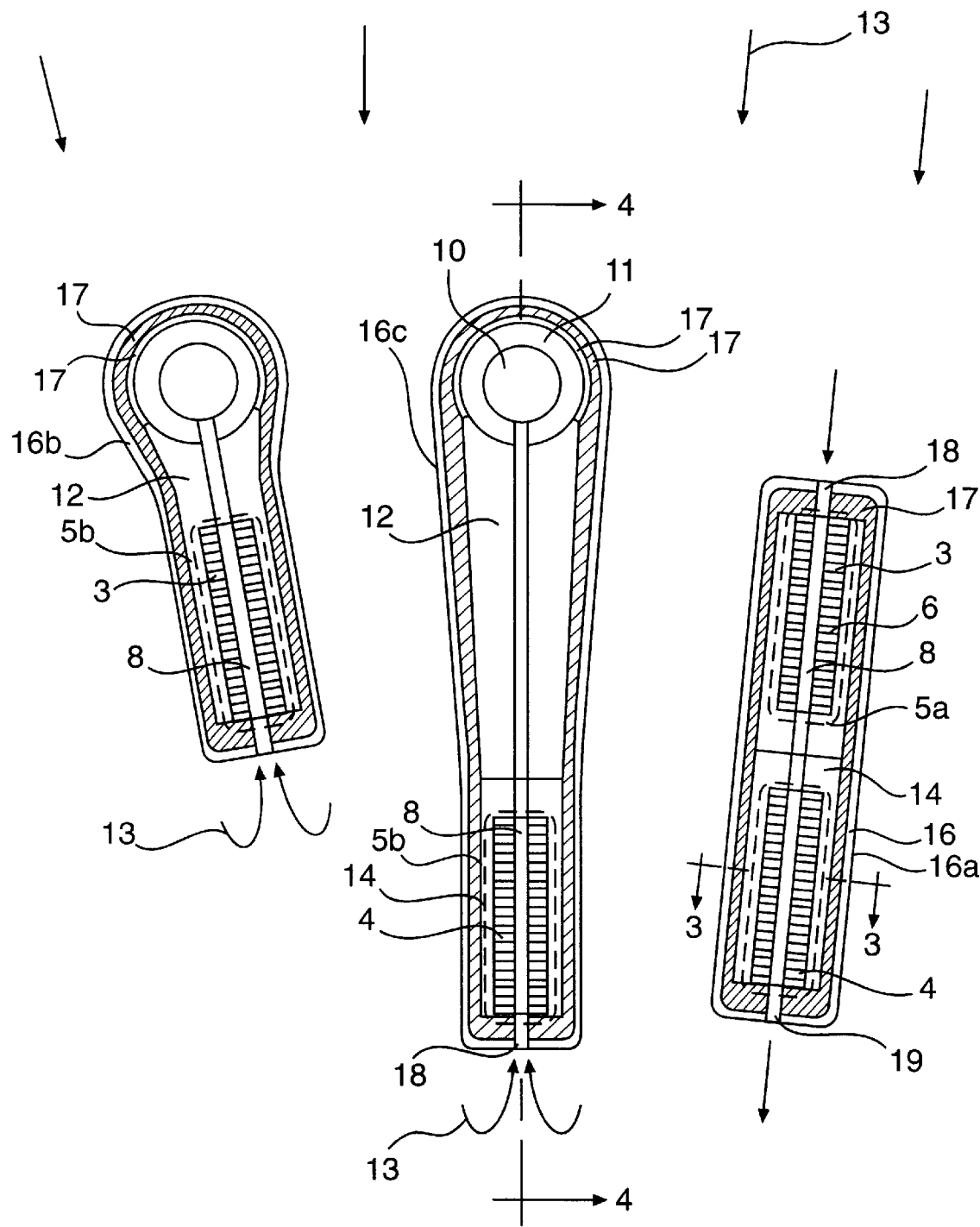
FIG. 2 shows a cross section through bar ends in the stator winding overhang according to FIG. 1, along the line 2—2 in FIG. 1.

As FIG. 2 shows, in order to cool the stator winding overhang and the so-called round connections or phase connections 20 connected to the stator winding bars, the invention now provides for radial cooling channels 8 to be arranged through the eyes 5a, 5b (which surround the winding ends) in the winding overhang area 30.

Figure 3:
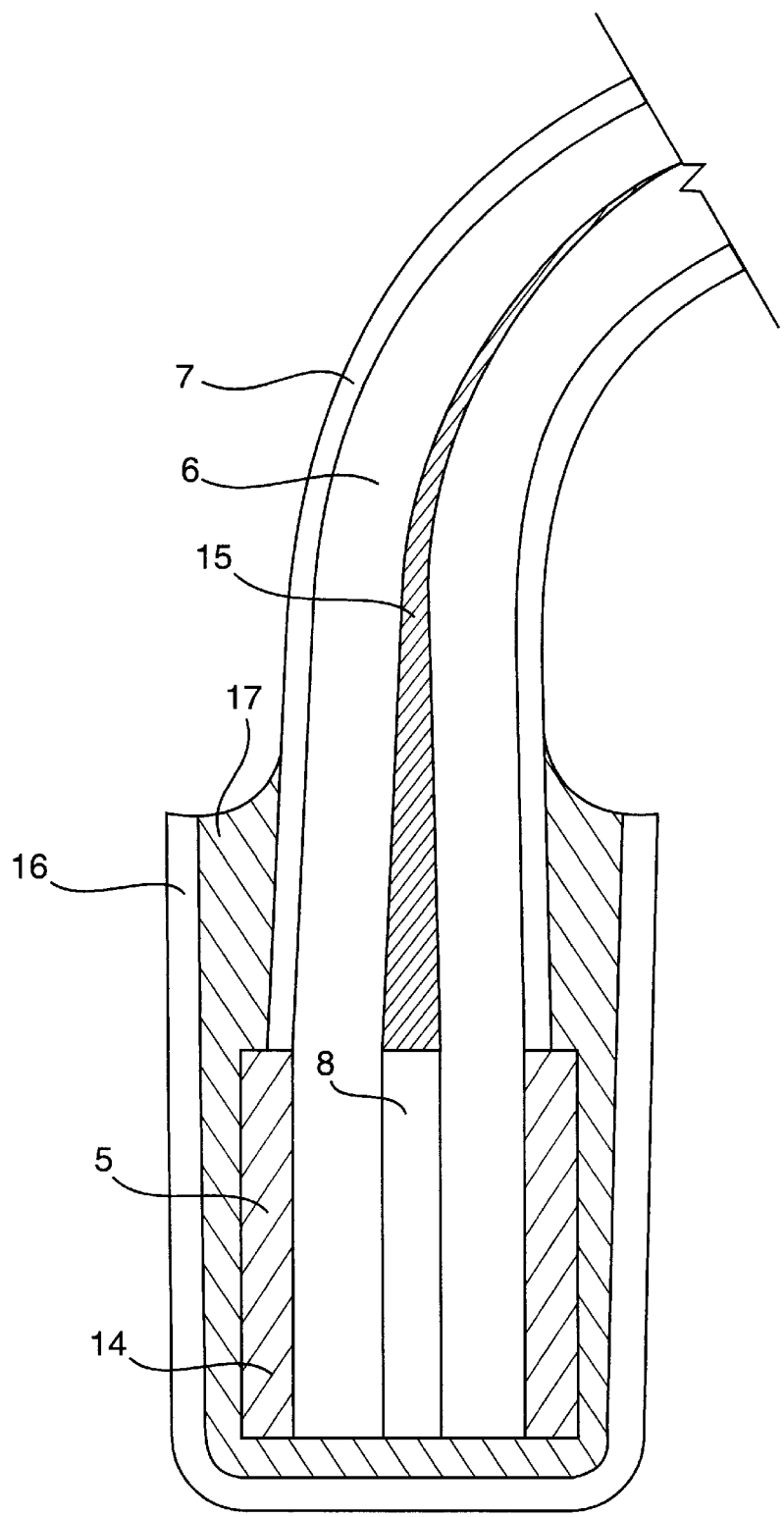
FIG. 3 shows a longitudinal section through a bar end according to FIG. 2, along the line 3—3 in FIG. 2.

The design of the bar ends with eyes 5a, 5b is described, in conjunction with FIG. 3, as follows: individual conductor elements 6 form two conductor element stacks located one above the other, such that a two-level bar is produced for the lower bar 3 or upper bar 4. Toward the bar ends, the conductor element stacks are spaced apart from one another by means of a wedge insert 15, in such a manner that the cooling channel 8 is formed between the bar levels at the respective bar end. The eye 5a, 5b surrounding the bar end comprises L-shaped metallic connecting pieces 14, which hold the bar levels. There, the conductor elements 6 are electrically and mechanically connected to one another and to the L-shaped connecting pieces 14 by soldering, the connecting pieces 14, aligned at the ends of their short limbs with the cooling channel 8, providing an opening for coolant flow. The eye 5a, 5b formed from the L-shaped connecting pieces 14 is surrounded by an insulating cap 16a, 16b, 16c, the intermediate area between the insulating cap 16a, 16b, 16c and the eye 5 being filled with a filling material 17.

A distinction is drawn in this case between normal eyes 5a and so-called discharge eyes 5b. Thus, in a normal eye 5a formed from four L-shaped connecting pieces 14, the bar ends of in each case one lower bar 3 and one upper bar 4 are joined together and are surrounded by an insulating cap 16a. In this case, the insulating cap 16a has an inlet opening 18 for the cooling channel 8 on the lower bar side, and an outlet opening 19 on the upper bar side. The flow direction of the cooling gas is designated 13. The essential feature for optimal cooling by means of flow passing through the bar ends with normal eyes 5a is a radial cooling gas supply. In the exemplary embodiment, the chosen flow direction 13 of the cooling gas is from the winding overhang outer circumference to the winding overhang inner circumference.

Figure 4:
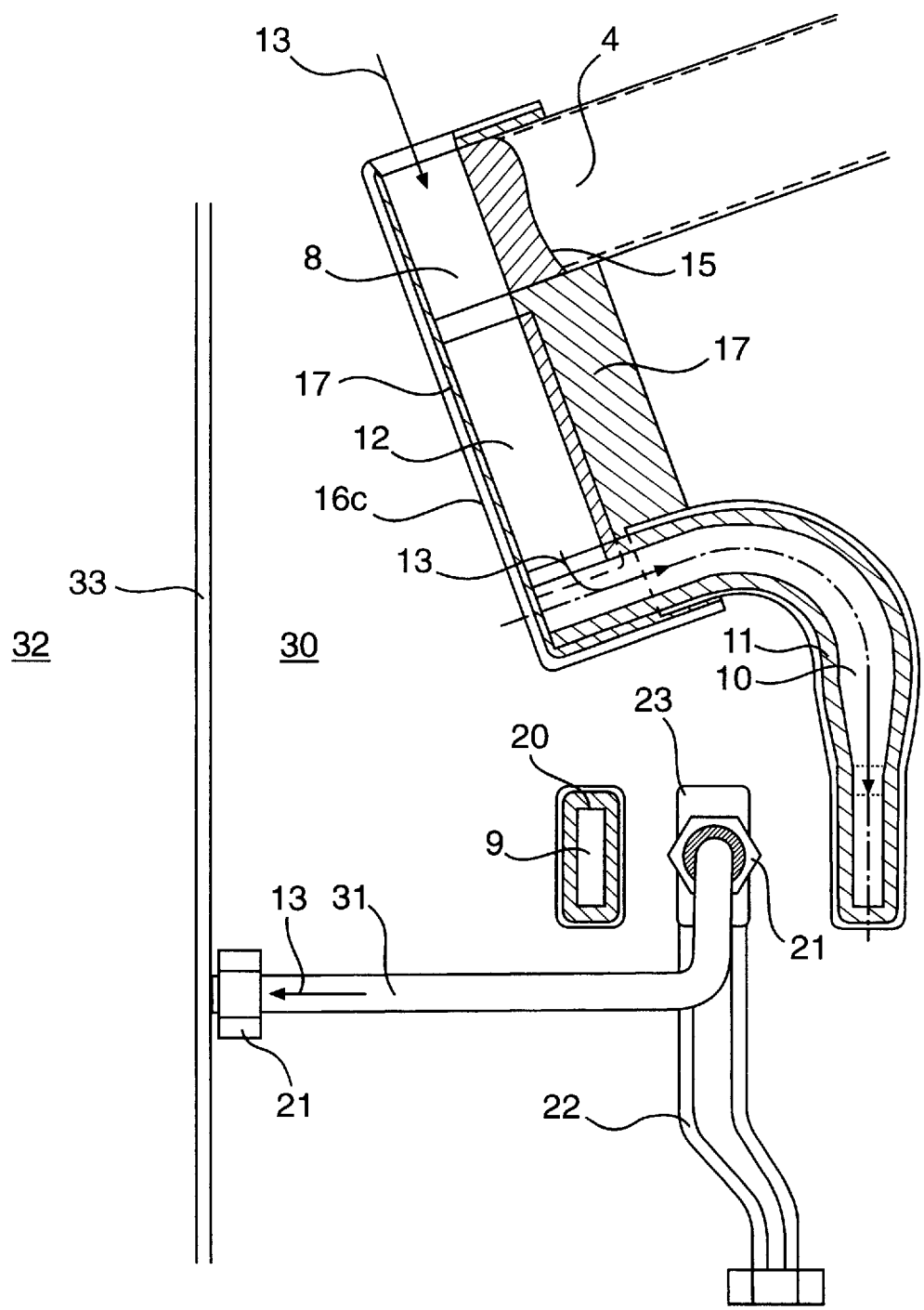
FIG. 4 shows a longitudinal section through discharge eyes according to FIG. 2, along the line 4—4 in FIG. 2, with the round connections connected to the discharge eyes.

The bar ends in the discharge eyes 5b are cooled in an equivalent manner to the cooling of the bar ends in normal eyes 5a. Discharge eyes 5b provide an electrical connection to the round connections or phase connections 20 which surround the winding overhang on its outer circumference (see FIG. 4), these round connections being conductively connected to the generator terminals (which are not illustrated). According to the invention, discharge eyes 5b are in each case installed around one bar end, that is to say the bar end of an upper bar 4 or lower bar 3. However, the basic design of the discharge eyes 5b at the upper bar ends or lower bar ends is identical, for which reason FIG. 4 shows only a section for the sections section 4—4 shown in FIG. 3. The design of the cooling arrangement at a discharge eye 5b is for this reason reduced to an arrangement at an upper bar end 4, in the following text.

Figure 5:
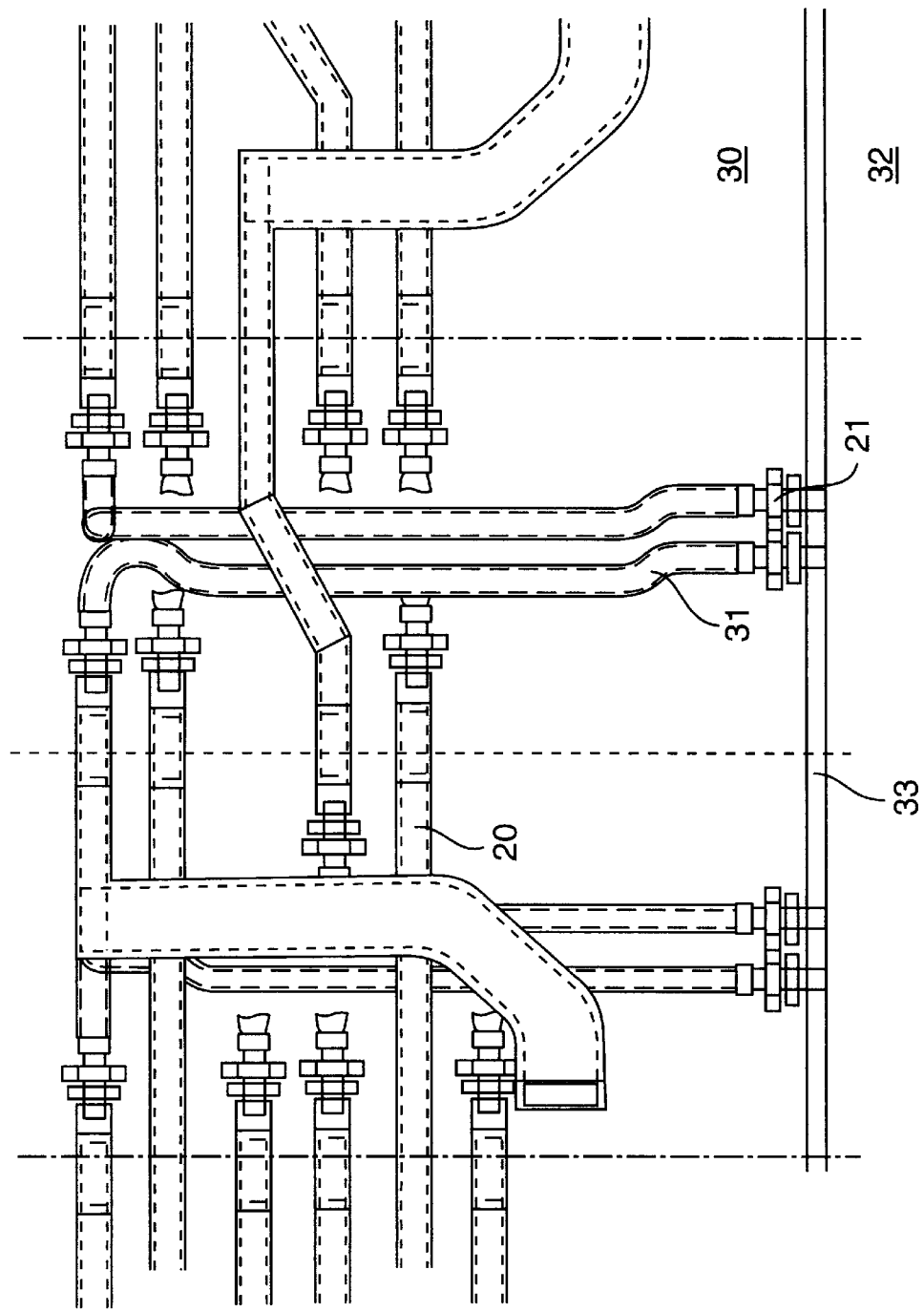
FIG. 5 shows a detail of a schematic development of the round connections.

As has already been described, the bar levels, which are spaced apart by means of the wedge insert 15, are held in a discharge eye 5b by L-shaped connecting pieces 14, in this case two of them. On the short limbs of the L-shaped connecting pieces 14, the discharge eyes 5b are electrically connected via metallic connecting pieces 12 to a pipe connection 11, and are connected in terms of the flow channel 8 by means of the discharge eye 5b. The discharge eye 5b is surrounded, with the end of the pipe connection 11, by an insulating cap 16c, which has an inlet opening 18, for the cooling gas, on the winding overhang inner circumference. The pipe connection 11 leads to a round connection 20 which surrounds the winding overhang radially on the outside, as FIG. 4 shows. In order to provide a clear illustration, the electrical and flow connections of the round connection 20 are illustrated separately, although each round connection 20 is provided with all these connections. The round connections 20 have a rectangular profile and are designed as hollow conductors with a cooling channel 9. The cooling channels 8 of the bar levels 5b are freely connected, in series, to cooling channels 10 in the pipe connections 11 and to cooling channels 9 in the round connections 20. Each round connection 20 is sealed by a sealing cap 23, the cooling channel 9 opening through the sealing cap 23 and a screw connection 21 into an insulating tube 31. The insulating tube 31 is likewise fixed at its other end by means of a screw connection to a bulkhead wall 33. As the developed illustration of the round connections 20 in FIG. 5 also shows, the insulating tubes 31 (bypassing the winding overhang area 30) connect the cooling channels 9 in the round connections 20 to a low-pressure area 32, for example the induction area of the machine fan (which is not shown), which is separated from the winding overhang area 30 by the radially running bulkhead wall 33. Terminal cables 22, of solid construction, provide the electrical connection to the generator terminals, which are not illustrated. The insulating tubes 31 may, of course, also be designed as insulating hoses, and are preferably made of Teflon. The cooling channels 8 in the discharge eyes 5b are thus freely connected to the induction area 32 of the machine fan, which ensures forced cooling of the discharge eyes 5b and of the round connections 20. As a result of the pressure difference in the induction area 32 and in the winding overhang area 30, a flow element of the cooling gas produced by the machine fan, symbolized by arrows in FIG. 4, flows through the cooling channel 8, then through the cooling channel 10 in the pipe connection 11, then through the cooling channel 9 in the round connection 20, and leaves the latter through the insulating tube 31 into the induction area 32 of the machine fan.

The opposite flow profile is also possible if, with a different configuration, the cooling gas flows in the opposite direction to that of the arrows 13 shown in FIG. 4, and the winding overhang area 30 is designed as the induction area of the machine fan.

Equipping eyes 5a, 5b according to the invention with radial cooling channels 8 at the bar ends, combined with cooling channels 9 for the round connections 20, ensures an optimal cooling arrangement, which is at the same time comparatively simple, for all the electrical conducting elements in the winding overhang region of limit-rating machines.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A gas-cooled electrical machine having a stator winding which is arranged in slots (1) in the laminated stator core (2), essentially comprising in each case two stator winding bars (3, 4) which are located one above the other in a slot (1), are constructed from mutually insulated conductor elements (6) and are electrically connected to one another outside the laminated stator core (2) in the winding overhang by means of eyes (5a, 5b) and round connections (20) to form a winding, the eyes (5a, 5b) comprising a number of normal eyes (5a) and a number of discharge eyes (5b), and having a fan for producing a cooling gas flow through the machine, a flow element of this cooling gas flow being passed through first cooling channels (8) located within the eyes (5a, 5b), wherein the stator winding bars in the winding overhang are provided with the said first cooling channels (8) only in the region of the eyes (5a, 5b), these first cooling channels (8) running essentially radially, wherein the discharge eyes (5b) have pipe connections (11) on the outlet side of the first cooling channels (8) between themselves and the round connections (20) which are designed as hollow conductors, the round connections (20) being designed as hollow conductors with second cooling channels (9) which are freely connected to the first cooling channels (8) of the discharge eyes (5b), and wherein the second cooling channels (9) in the round connections (20) are connected by means of insulating tubes (31) or insulating hoses to an area (32) which is separated from the winding overhang area (30) by means of a bulkhead wall (33).

2. The electrical machine as claimed in claim 1, wherein the stator winding bars (34) are designed as two-level bars whose bar levels in the winding overhang region are in each case spaced apart from one another by means of a wedge insert (15), such that the radial first cooling channels (8) are formed between the bar levels at the bar ends.

3. The electrical machine as claimed in claim 2, wherein the eyes (5a, 5b) are constructed from metallic connecting pieces (14) which are spaced apart from one another in the region of the first cooling channels (8).

4. The electrical machine as claimed in claim 1, wherein the flow element of the cooling gas flow which cools the winding overhang has an essentially radial flow direction (13).

5. The electrical machine as claimed in claim 1, wherein the eyes (5a, 5b) are surrounded by insulating caps (16a, 16b, 16c) which have inlet and/or outlet openings (18, 19) for the first cooling channels (8).

6. The electrical machine as claimed in claim 1, wherein the area (32) which is separated from the winding overhang area (30) by the bulkhead wall (33) is the induction area of the machine fan.

* * * * *